Dec. 30, 1958     C. M. YEOMANS     2,866,905

DEVICE FOR EXPOSING AN OBJECT TO RADIATION

Filed Jan. 6, 1956     2 Sheets-Sheet 1

INVENTOR
CLIVE M. YEOMANS,

BY Benjamin G. Weil

ATTORNEY

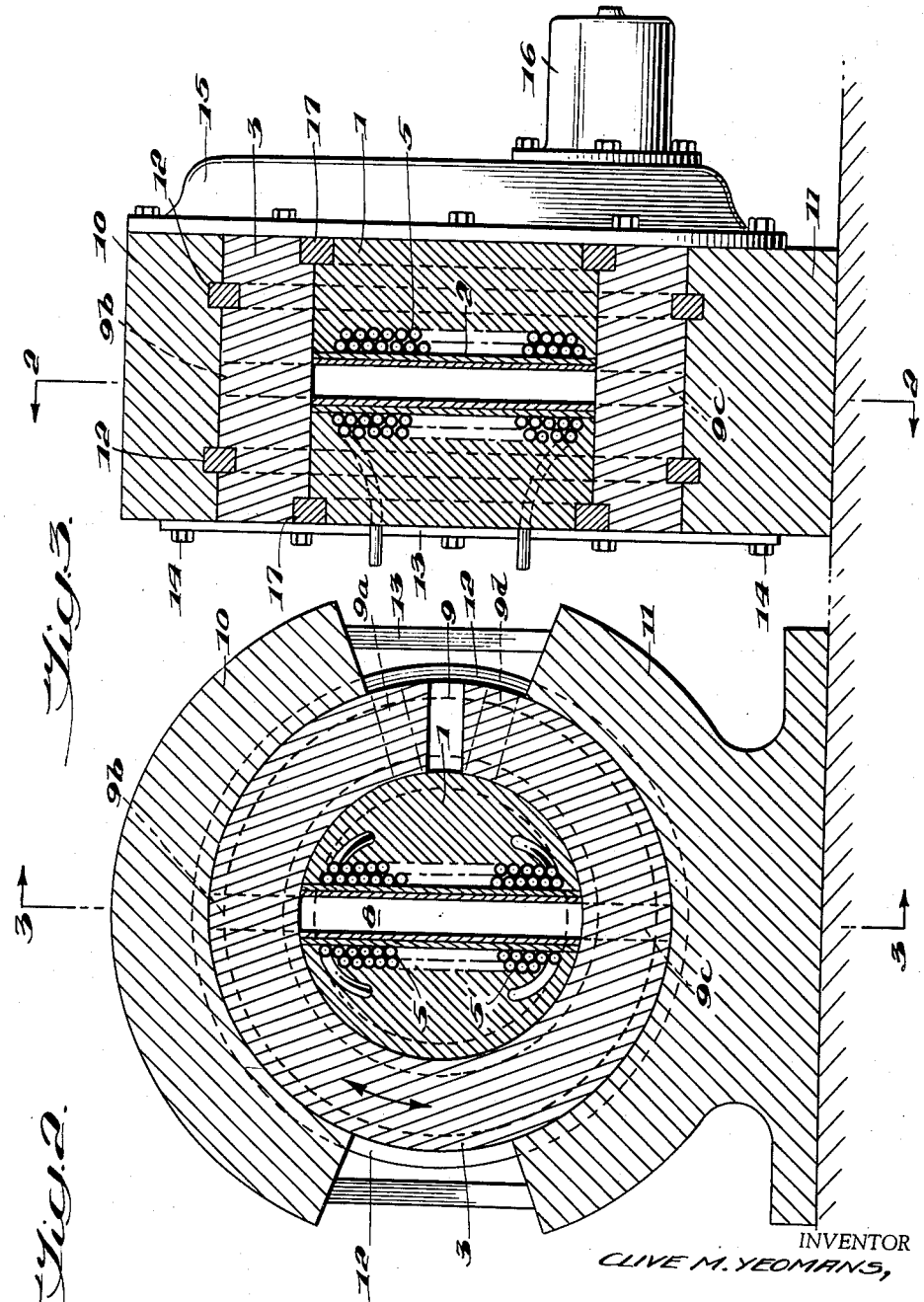

United States Patent Office 2,866,905
Patented Dec. 30, 1958

2,866,905

DEVICE FOR EXPOSING AN OBJECT TO RADIATION

Clive M. Yeomans, Baltimore, Md., assignor to The Martin Company, Middle River, Md., a corporation of Maryland Application January 6, 1956, Serial No. 557,764

12 Claims. (Cl. 250—106)

This invention relates to a device to permit the controlled exposure of objects or fluids to radiation while affording the proper protection for the operator.

It is usual in the exposure of solid objects or fluids to a source of radiation to provide specially prepared rooms having thick, shielded concrete walls, or shielded pits, each of which requires additional shielding and some kind of a remotely controlled handling device for handling the material to be exposed to a source of radiation.

It is an object of this invention to provide a device in which objects may be placed for exposure to a source of radiation while providing adequate shielding to the operator from radiation.

It is another object of this invention to provide a device in which an object may be exposed to radiation for a predetermined period of time.

It is a further object of this invention to provide a device arranged so that the loading and unloading of objects may be accomplished with a minimum of manual effort, while providing complete shielding from exposure of the operator to the source of radiation.

Further and other objects will be apparent from the description of the accompanying drawings in which like numerals refer to like parts.

In the drawings:

Fig. 2 is a section taken on line 2—2 of Fig. 3; and

Fig. 3 is a section taken on line 3—3 of Fig. 2.

Figure 1:
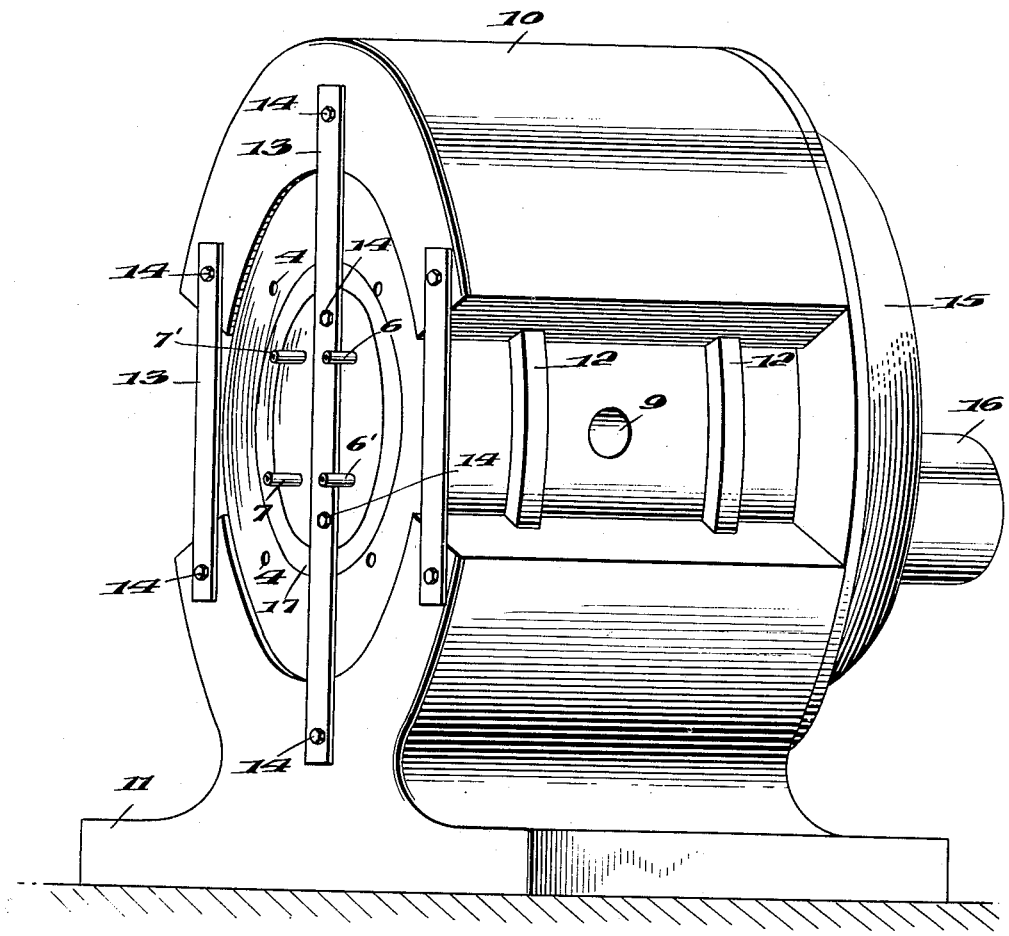
Fig. 1 is a pictorial representation of a device accomplishing the objects of this invention.

The device illustrated in the drawings comprises a central core 1 which is made more or less in the form of a right cylinder. It is constructed of a suitable shielding material and may, where required, have additional shielding material or reinforcement incorporated in the cylinder. At the center of the cylinder, a hole or passage 8 extends completely through the cylinder, normal to the axis thereof. The walls surrounding passage 8 in cylinder 1 contain radioactive material 2. Surrounding the core 1 is a cylindrical shield 3 mounted coaxial with and rotatable about core 1. Cylindrical shield 3 is supported by base member 11. Shield 10 is spaced from base member 11 by spacers 13. Shield 10 extends over cylindrical shield 3, and is formed so that its inner surface conforms to the outside surface of cylindrical shield 3, so that shield 3 rotates around core 1 and within members 10 and 11. Straps 13 are structural elements supporting shield 10 on base member 11 to permit the rotation of cylindrical shield 3. Core 1 is also secured against rotation by central strap 13. Rings 12 of a suitable shielding material on shield 3 prevent radiation axially of the cylindrical surface of shield 3. End rings 17 of a suitable shielding material prevent radiation axially of the cylindrical surface of cylinder 1. Indentation 4, shown in Fig. 1, are provided in the end of cylindrical shield 3 to provide for the manual rotation of the cylinder by an engaging tool having engaging projections fitting into these indentations or indicate the position of the cylinder with respect to the core. Straps 13 are secured to members 1, 10 and 11 by, for example, bolts 14.

Coils 5 and 5' are provided within core 1, having inlet and outlet connections 6 and 6' and 7 and 7' surrounding passage 8 and radioactive material 2. These coils serve the dual function of permitting the passage of fluids to maintain a predetermined temperature condition within passage 8, or they may be used for the exposure of one or more fluids or gases to the effects of radioactive material 2, or one may control temperature of the fluid in the other.

Cylindrical shield 3 has a passage 9 extending therethrough, which is located to be aligned with passage 8 at some point in the rotation of shield 3 on core 1. It will be noted that passage 8 is so located in core 1 relative to members 10 and 11 that even when passage 9 is aligned with passage 8, the transmission of radiation to the area surrounding the device is precluded.

Cylindrical shield 3 may be rotated so that passage 9 will be in a position, for example 9a, at which position an object to be exposed to source of radiation 2 will be placed. Upon further rotation of cylindrical shield 3, passage 9 will be aligned with passage 8 at 9b and the object will drop into passage 8 and therein be exposed to radiation. After a predetermined period of time, cylindrical shield 3 will be further rotated until passage 9 is aligned with the lower end of passage 8 at 9c, at which time the object will fall into passage 9 and be rotated to a position such as 9d, at which position the object can be removed. It is contemplated, of course, that passage 8 be generally vertical so that objects may be dropped from passage 9 into passage 8 under the force of gravity and removed from passage 8 in a similar manner. It is obviously further contemplated that the objects to be subjected to radiation within this device are to be of a weight heavier than air.

To secure more precise control of the timing, a gear box 15 is provided, whereby motor 16 may be connected to rotate cylindrical shield 3 at a predetermined speed. Objects may be then placed in the passage 9 between positions 9 and 9a and as the cylindrical shield 3 rotates, may be removed when passage 9 reaches the position 9d.

The passage of fluids through coils 5 and 5' while an object is in passage 8 will serve to control the temperature of the object while being subjected to radiation. Either coil 5 or 5' may be used to independently irradiate fluids by exposing the fluids to the source of radiation 2 or either may be a temperature control for the other.

It is to be understood that certain changes, alterations, modifications and substitutions can be made without departing from the spirit and scope of the appended claims.

I claim:

1. A device for exposing an object having a weight greater than air to radiation comprising a block member of shielding material having a generally vertical passage formed therein for the reception of an object to be exposed to radiation, radioactive material positioned in said block member to irradiate said passage, an outer member of shielding material fixed with respect to said block member and aligned to cover said passage formed in said block member to prevent radiation therefrom, an intermediate member movable between said block member and said outer shielding member, said intermediate member having aperture means formed therein capable of being moved to a position outside said outer member to receive an object to be irradiated, and subsequently moved to a position to align said aperture means with said passage to drop said object into said passage for irradiation.

2. A device for exposing an object having a weight greater than air to radiation comprising a block member of shielding material having a generally vertical passage formed therein for the reception of an object to be exposed to radiation, radioactive material positioned in said block member to irradiate said passage, an outer member of shielding material fixed with respect to said block member and aligned to cover said passage formed in said block member to prevent radiation therefrom, an intermediate member movable between said block member and said outer shielding member, said intermediate member having aperture means formed therein capable of being moved to a position to receive an object to be irradiated and subsequently moved to a position to align said aperture with said passage to drop said object into said passage for irradiation, and means between the surfaces of said adjacent members to prevent radiation along such surfaces.

3. A device for exposing an object having a weight greater than air to radiation comprising a block member of shielding material having a generally vertical passage formed therein for the reception of an object to be exposed to radiation, radioactive material positioned in said block member to irradiate said passage, an outer member of shielding material fixed with respect to said block member and aligned to cover each end of said passage formed in said block member to prevent radiation therefrom, an intermediate member movable between said block member and said outer shielding member, said movable member having aperture means formed therein capable of being moved to a position to receive an object to be irradiated in the aperture of said movable member and moved to a position to align said aperture with said passage to drop said object into said passage for irradiation, and moved to a position to remove said object from said passage and moved to a position outside said outer shielding member for removal of said object from said aperture formed in said intermediate member.

4. A device for exposing an object having a weight greater than air to radiation comprising a block member of shielding material having a generally vertical passage formed therein for the reception of an object to be exposed to radiation, radioactive material positioned in said block member to irradiate said passage, an outer member of shielding material fixed with respect to said block member and aligned to cover said passage formed in said block member, an intermediate member movable between said block member and said shielding member, means in said movable member to move an object to be irradiated, from a position outside said outer member to a position into alignment with said passage to drop said object into said passage for irradiation, and remove the object therefrom without uncovering said source of radiation.

5. A device for exposing an object having a weight greater than air to radiation comprising a horizontal, cylindrical core member of shielding material having a generally vertical passage formed therein for the reception of an object to be exposed to radiation, radioactive material positioned in said cylindrical member to irradiate said passage, a cylindrical ring member mounted with a sliding fit on said cylindrical core member to rotate with respect thereto, said cylindrical ring member having an aperture formed therein capable of being aligned with said passage in said core member, an outer radiation-shield member fixed with respect to said core member to effectively shield radiation when said aperture is aligned with said passage, said aperture in said cylindrical shield member movable to a position for the reception of an object to be irradiated and subsequently moved to a position to drop said object into said passage for irradiation and rotatable to a further position wherein the aperture is again aligned with said passage on the bottom side of said passage to drop the object into said cylindrical ring member for removal from said passage.

6. A device for exposing an object having a weight greater than air to radiation comprising a horizontal, cylindrical core member of shielding material having a generally vertical passage formed therein for the reception of an object to be exposed to radiation, radioactive material positioned in said cylindrical member to irradiate said passage, a cylindrical ring member mounted with a sliding fit on said cylindrical core member to rotate with respect thereto, said cylindrical ring member having an aperture formed therein capable of being aligned with said passage in said core member, an outer radiation-shield member fixed with respect to said core member to effectively shield radiation when said aperture is aligned with said passage, sealing means to prevent radiation along the surfaces of said cylindrical members, said aperture in said cylindrical shield member movable to a position for the reception of an object to be irradiated and subsequently moved to a position to drop said object into said passage for irradiation and rotatable to a further position wherein the aperture is again aligned with said passage on the bottom side of said passage to drop the object into said cylindrical ring member for removal from said passage.

7. A device for exposing an object having a weight greater than air to radiation comprising a horizontal, cylindrical core member of shielding material having a generally vertical passage formed therein for the reception of an object to be exposed to radiation, radioactive material positioned in said cylindrical member to irradiate said passage, a cylindrical ring member mounted with a sliding fit on said cylindrical core member to rotate with respect thereto, said cylindrical ring member having an aperture formed therein capable of being aligned with said passage in said core member, an outer radiation-shield member fixed with respect to said core member to effectively shield radiation when said aperture is aligned with said passage, said aperture in said cylindrical shield member movable to a position for the reception of an object to be irradiated and subsequently moved to a position to drop said object into said passage for irradiation and rotatable to a further position wherein the aperture is again aligned with said passage on the bottom side of said passage to drop the object into said cylindrical ring member for removal from said passage, and means to rotate said cylindrical shield member with respect to said core member.

8. A device for exposing an object to radiation comprising a horizontal, cylindrical core member of shielding material having a generally vertical passage formed therein for the reception of an object to be exposed to radiation, radioactive material positioned in said cylindrical member to irradiate said passage, a hollow tubular member adjacent said radioactive material surrounding said passage, a cylindrical ring member mounted with a sliding fit on said cylindrical core member to rotate with respect thereto, said cylindrical ring member having an aperture formed therein capable of being aligned with said passage in said core member, an outer radiation-shield member fixed with respect to said core member to effectively shield radiation when said aperture is aligned with said passage, said aperture in said cylindrical shield member movable to a position for the reception of an object to be irradiated and subsequently moved to a position to drop said object into said passage for irradiation and rotatable to a further position wherein the aperture is again aligned with said passage on the bottom side of said passage to drop the object into said cylindrical ring member for removal from said passage.

9. A device for exposing an object to radiation comprising a horizontal, cylindrical core member of shielding material having a generally vertical passage formed therein for the reception of an object to be exposed to radiation, radioactive material positioned in said cylindrical member to irradiate said passage, a plurality of tubular members adjacent said radioactive material surrounding said passage, a cylindrical ring member mounted with a sliding fit on said cylindrical core member to rotate with respect thereto, said cylindrical ring member having an aperture formed therein capable of being aligned with said passage in said core member, an outer radiation-shield member fixed with respect to said core member to effectively shield radiation when said aperture is aligned with said passage, said aperture in said cylindrical shield member movable to a position for the reception of an object to be irradiated and subsequently moved to a position to drop said object into said passage for irradiation and rotatable to a further position wherein the aperture is aligned with said passage on the bottom side of said passage to drop the object into said cylindrical ring member for removal from said passage.

10. In a device for exposing both objects having a weight greater than air and fluids and gases to radiation, the combination comprising a horizontal, cylindrical core member of shielding material having a generally vertical passage formed therein for the reception of an object to be exposed to radiation, radioactive material positioned in said cylindrical member to irradiate said passage, tubular means surrounding said passage and said radioactive material for the exposure of fluids and gases to the radiation emitted by said radioactive material, a cylindrical ring member mounted with a sliding fit on said cylindrical core member to rotate with respect thereto, said cylindrical ring member having an aperture formed therein capable of being aligned with said passage in said core member, an outer radiation-shield member fixed with respect to said core member to effectively shield radiation when said aperture is aligned with said passage, said aperture in said cylindrical shield member movable to a position for the reception of an object to be irradiated and subsequently moved to a position to drop said object into said passage for irradiation and rotatable to a further position wherein the aperture is aligned with said passage on the bottom side of said passage to drop the object into said cylindrical ring member for removal from said passage.

11. In a device for exposing both objects having a weight greater than air and fluids and gases to radiation, the combination comprising a horizontal, cylindrical core member of shielding material having a generally vertical passage formed therein for the reception of an object to be exposed to radiation, radioactive material positioned in said cylindrical member to irradiate said passage, tubular means surrounding said passage and said radioactive material permitting the passage of fluids to maintain a predetermined temperature within said passage, a cylindrical ring member mounted with a sliding fit on said cylindrical core member to rotate with respect thereto, said cylindrical ring member having an aperture formed therein capable of being aligned with said passage in said core member, an outer radiation-shield member fixed with respect to said core member to effectively shield radiation when said aperture is aligned with said passage, said aperture in said cylindrical shield member movable to a position for the reception of an object to be irradiated and subsequently moved to a position to drop said object into said passage for irradiation and rotatable to a further position wherein the aperture is aligned with said passage on the bottom side of said passage to drop the object into said cylindrical ring member for removal from said passage.

12. In a device for exposing both objects having a weight greater than air and fluids and gases to radiation, the combination comprising a horizontal, cylindrical core member of shielding material having a generally vertical passage formed therein for the reception of an object to be exposed to radiation, radioactive material positioned in said cylindrical member to irradiate said passage, tubular means surrounding said passage and said radioactive material for the exposure of fluids and gases to the radiation emitted by said radioactive material, means associated with said tubular means for controlling the temperature of material within said tubular means, a cylindrical ring member mounted with a sliding fit on said cylindrical core member to rotate with respect thereto, said cylindrical ring member having an aperture formed therein capable of being aligned with said passage in said core member, an outer radiation-shield member fixed with respect to said core member to effectively shield radiation when said aperture is aligned with said passage, said aperture in said cylindrical shield member movable to a position for the reception of an object to be irradiated and subsequently moved to a position to drop said object into said passage for irradiation and rotatable to a further position wherein the aperture is aligned with said passage on the bottom side of said passage to drop the object into said cylindrical ring member for removal from said passage.

References Cited in the file of this patent

UNITED STATES PATENTS

| | | |
|---|---|---|
| 1,853,282 | O'Neill | Apr. 12, 1932 |
| 1,991,934 | McCray | Feb. 19, 1935 |
| 2,594,970 | Monk | Apr. 29, 1952 |
| 2,750,517 | Baum | June 12, 1956 |